US012352575B2

(12) United States Patent
Ichiriyama et al.

(10) Patent No.: US 12,352,575 B2
(45) Date of Patent: Jul. 8, 2025

(54) SURVEY METHOD, MOBILE TERMINAL, SURVEY SYSTEM, AND STORAGE MEDIUM

(71) Applicant: TOPCON CORPORATION, Tokyo (JP)

(72) Inventors: Umihiro Ichiriyama, Tokyo (JP); Ryosuke Shimizu, Tokyo (JP); Yoshihiro Nishi, Tokyo (JP); Motohiro Miyajima, Tokyo (JP); Keisuke Nakamura, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 290 days.

(21) Appl. No.: 17/940,488

(22) Filed: Sep. 8, 2022

(65) Prior Publication Data
US 2023/0003527 A1 Jan. 5, 2023

Related U.S. Application Data

(63) Continuation-in-part of application No. PCT/JP2021/008425, filed on Mar. 4, 2021.

(30) Foreign Application Priority Data

Mar. 13, 2020 (JP) ................................ 2020-044481

(51) Int. Cl.
*G01C 21/00* (2006.01)
*G01C 15/00* (2006.01)
(Continued)

(52) U.S. Cl.
CPC ......... *G01C 21/005* (2013.01); *G01C 15/002* (2013.01); *G01C 15/004* (2013.01);
(Continued)

(58) Field of Classification Search
USPC ............................................................ 702/2
See application file for complete search history.

(56) References Cited

U.S. PATENT DOCUMENTS

| | | | |
|---|---|---|---|
| 2004/0029558 A1* | 2/2004 | Liu | G01S 5/0244 455/456.2 |
| 2008/0074638 A1 | 3/2008 | Sakimura et al. | |

(Continued)

FOREIGN PATENT DOCUMENTS

| | | |
|---|---|---|
| EP | 1 503 176 A2 | 2/2005 |
| JP | H05-028925 U | 4/1993 |

(Continued)

OTHER PUBLICATIONS

Topcon Corporation et al. "Operation Manual for Data Collector FC-500" Kantoku-san.V [2. Observation] 2015, pp. 1-145.

*Primary Examiner* — Paul D Lee
(74) *Attorney, Agent, or Firm* — Studebaker Brackett PLLC

(57) ABSTRACT

Provided is a survey method using a position acquiring device that acquires position coordinates of a worker and a mobile terminal capable of communicating with the position acquiring device. the mobile terminal sets an advancing direction of observation and a first measurement point in three-dimensional design data, and makes the position acquiring device acquire position coordinates of the worker, the mobile terminal guides the worker to the first measurement point, makes the position acquiring device acquire position coordinates of the worker at the first measurement point, and sets a point nearest from the first measurement point in the advancing direction as a second measurement point, and after that, a position of the worker, setting of a next measurement point, and guidance to the next measurement point are repeated.

11 Claims, 15 Drawing Sheets

(51) Int. Cl.
   *G01C 15/02*   (2006.01)
   *G01S 17/89*   (2020.01)
   *G01S 19/42*   (2010.01)
(52) U.S. Cl.
   CPC ............. *G01C 15/02* (2013.01); *G01S 17/89* (2013.01); *G01S 19/42* (2013.01)

(56) References Cited

U.S. PATENT DOCUMENTS

| | | | |
|---|---|---|---|
| 2008/0151216 A1* | 6/2008 | Schiavi | G01C 15/002 356/3 |
| 2009/0138233 A1* | 5/2009 | Kludas | G01S 17/89 382/254 |
| 2019/0302273 A1 | 10/2019 | Sano et al. | |

FOREIGN PATENT DOCUMENTS

| | | |
|---|---|---|
| JP | 2005-043088 A | 2/2005 |
| JP | 2005-214630 A | 8/2005 |
| JP | 2006-003206 A | 1/2006 |
| JP | 2008-082895 A | 4/2008 |
| JP | 2019-178983 A | 10/2019 |
| JP | 2019-219195 A | 12/2019 |

\* cited by examiner

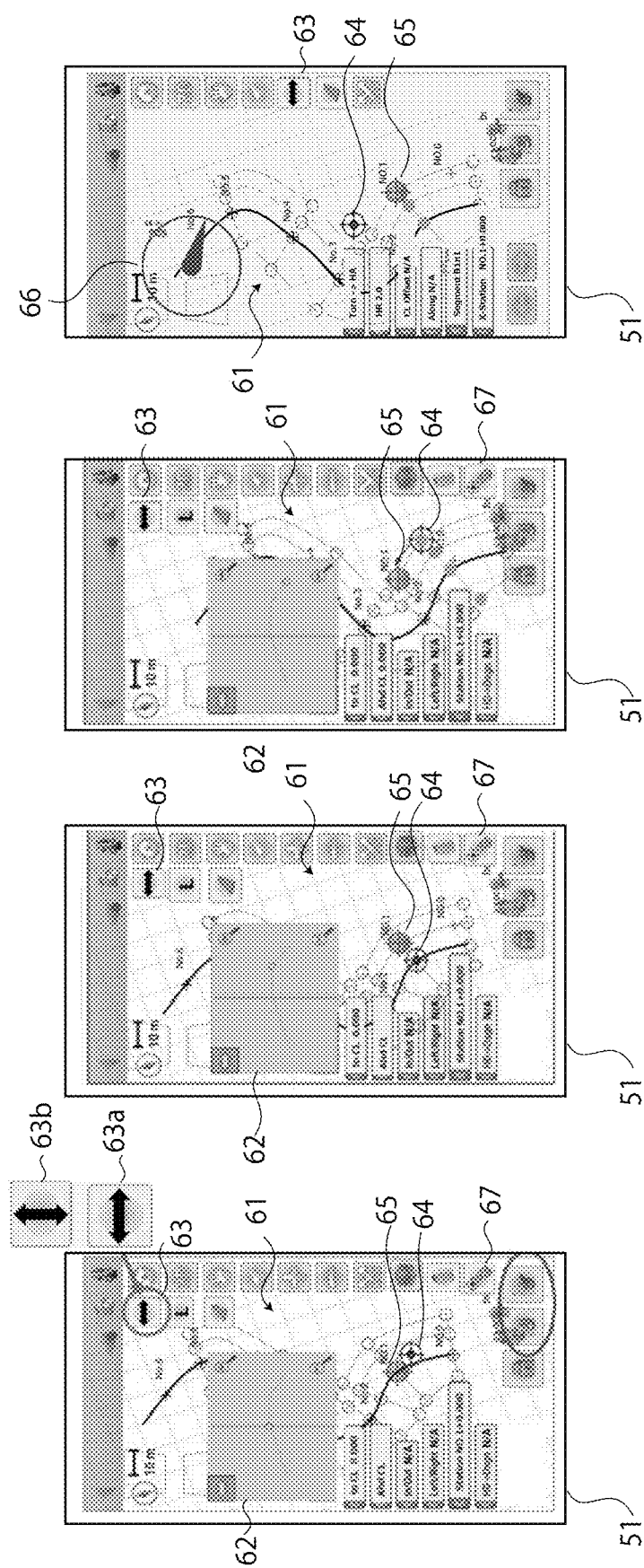

Cross-sectional direction

Route direction

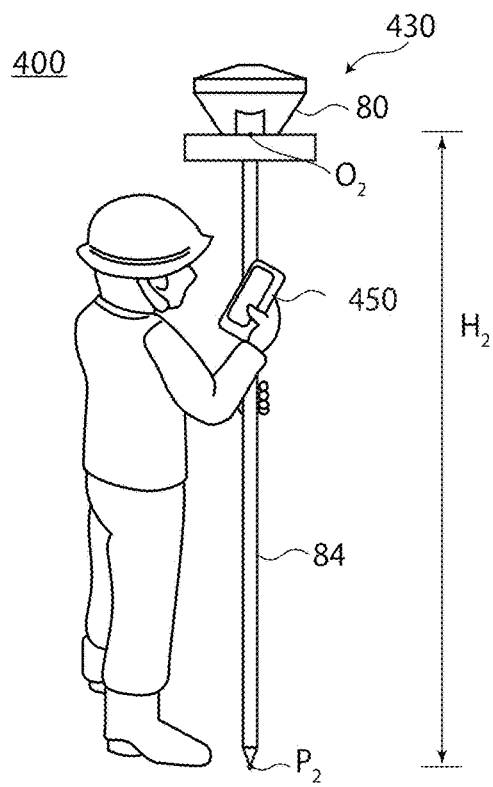
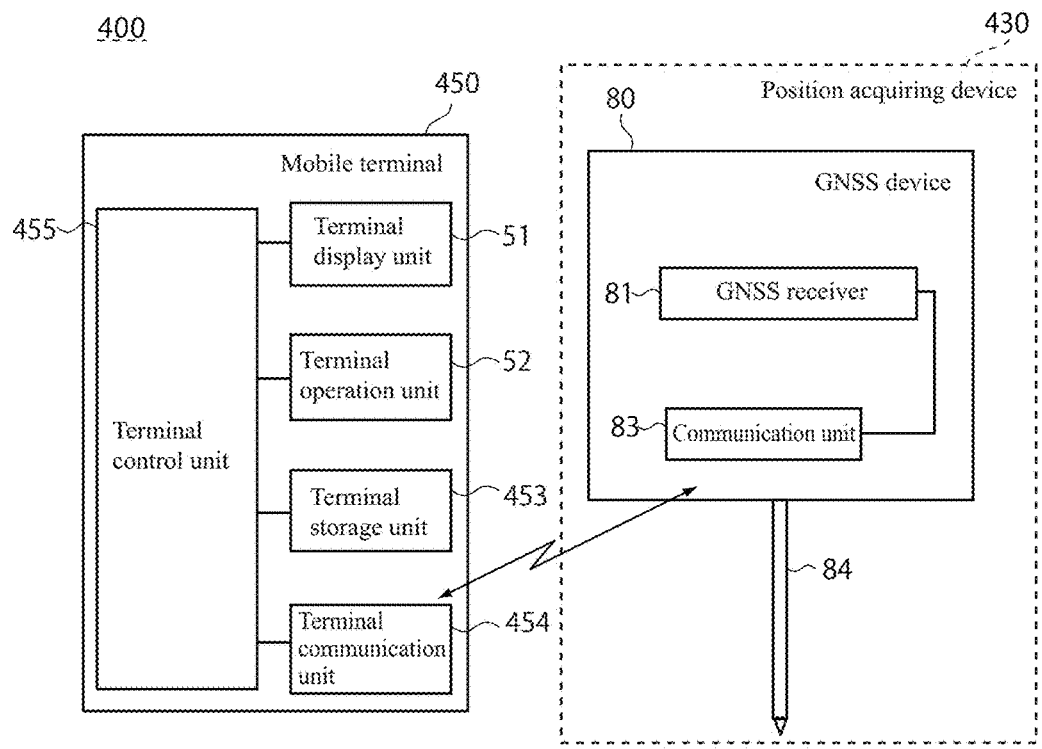
FIG. 16

SURVEY METHOD, MOBILE TERMINAL, SURVEY SYSTEM, AND STORAGE MEDIUM

CROSS-REFERENCE TO RELATED APPLICATION, BENEFIT CLAIM, AND INCORPORATION BY REFERENCE

This application is a continuation-in-part of and claims benefit under 35 USC 120 and 365(c) to copending International Application No. PCT/JP2021/008425, entitled "SURVEYING METHOD, SURVEYING SYSTEM, AND PROGRAM", filed 4 Mar. 2021, the content of which is incorporated herein in its entirety by reference.

TECHNICAL FIELD

The present invention relates to a survey method, a survey system, and a storage medium, and more specifically, to a survey method, a survey system, and a storage medium for route survey setting and observation of a managed section as-built part relating to route construction.

BACKGROUND ART

In construction of a route such as a road, first, route survey such as centerline surveying and cross-sectional surveying is performed, and based on a result of the route survey, three-dimensional design data is created. In the three-dimensional design data, center points set at predetermined intervals on a centerline, constituent points indicating a road width, and constituent points serving as change points of a landform on a section orthogonal to the centerline are set. At a site, route survey setting of installing stakes, rivets, etc. at designated center points and constituent points is performed, and with these as references, work such as cutting and banking is performed. After construction of the route, in order to confirm an as-built part, observation of a managed section as-built part is performed by measuring the designated center points and constituent points.

In recent years, for cross-sectional surveying and observation of a managed section as-built part, an electro-optical device such as a total station or a GNSS device is generally used. Patent Literature 1 discloses a survey system in which at the time of performing a survey with a total station, a mobile terminal such as a PDA (Personal Digital Assistant) reads three-dimensional design data to collect survey data and guide a surveying assistant. Patent Literature 1 discloses a survey system in which at the time of performing a survey with a total station, a mobile terminal such as a PDA (Personal Digital Assistant) reads three-dimensional design data, collects survey data and guides a surveying assistant.

Further, Non-Patent Literature 1 discloses a technique of reading three-dimensional design data in which a centerline and center points of a route are set by a mobile terminal capable of communicating with a surveying instrument, and in combination of a total station and a target, assisting execution of route survey setting and observation of a managed section as-built part.

CITATION LIST

Patent Literature

Patent Literature 1: Japanese Published Unexamined Patent Application No. 2008-82895
Patent Literature 2: Japanese Published Unexamined Utility Model Application No. H05-28925
Patent Literature 3: Japanese Published Unexamined Patent Application No. 2019-178983

Non-Patent Literature

Non-Patent Literature 1: Operation Manual for Data Collector FC-500 Kantoku-san. V, TOPKON CORPORATION

SUMMARY OF INVENTION

Technical Problem

By the method of Non-Patent Literature 1, at the time of starting measurement, a worker selects a section to be measured from the mobile terminal, sets left and right offset values from a center point on the section, and proceeds with observation for each point. Description will be given with reference to FIGS. 1A to 1D. In FIGS. 1A to 1D, reference sign CL denotes a centerline. Reference signs $P1_{CL}$, $P2_{CL}$, . . . denote center points (stakes). Reference signs No. 1, No. 2, . . . denote cross-sections respectively at the center points (stakes) $P1_{CL}$, $P2_{CL}$, . . . . Reference signs $P1_1$, $P1_2$, . . . denote constituent points. Reference signs $P1_1$, $P1_2$, . . . denote constituent points on the cross-section No. 1, and reference signs $P2_1$, $P2_2$, . . . denote constituent points on the cross-section No. 2.

For example, it is assumed that a site of FIG. 1A is observed from the point $P1_1$. A worker O first selects the section No. 1 from the mobile terminal, and inputs and sets a distance between the point $P1_1$ and the point $P1_{CL}$ as the left offset value (offset from a center point). Next, while tracking the target by the surveying instrument, the worker O moves to the point $P1_1$ following a guidance display displayed on a display unit of the mobile terminal. As illustrated in FIG. 1B, the worker O then installs the target at the point $P1_1$, and makes the surveying instrument measure the target from the mobile terminal. Measurement data is input into the mobile terminal. After that, as illustrated by the arrow A, the worker O measures while successively moving to $P1_2$, $P1_{CL}$, . . . . At this time, every time when moving between the points, the worker O is required to re-set sections and offset values from the mobile terminal, and work is complicated.

Further, as in FIG. 1C, in a case of a landform where there are height differences in the sections, and if measuring for each section, the worker O is required to repeat up and down movement, which is inefficient. Thus, as illustrated by the arrow B in FIG. 1D, it is preferable to proceed with an observation work of measurement points at the same height in the order of $P1_1$, $P2_1$, $P3_1$, . . . . However, in this case, there is also a need for re-setting sections and offset values by the mobile terminal every time when moving between the sections, and work is complicated.

The present invention was made in view of the above circumstances, and an object thereof is to provide a technique that enables efficient observation in accordance with a landform with a simple operation in route survey setting or observation of a managed section as-built part.

Solution to Problem

In order to achieve the object described above, a survey method according to an aspect of the present invention is a survey method using a position acquiring device configured to acquiring position coordinates of a worker, the position acquiring device including a communication unit, and a mobile terminal including a terminal communication unit capable of communicating with the position acquiring device, a terminal display unit, a terminal operation unit, and a terminal control unit including a processor and a memory. The survey method comprising the steps of, (a) the terminal control unit reading three-dimensional design data including a plurality of center points which are set at predetermined intervals on a centerline of a route, and a plurality of measurement points which are set on a cross-section passing through the center points, the cross-section being orthogonal to the centerline, and displays on the terminal display unit, (b) the terminal control unit setting an advancing direction of observation to a cross-sectional direction or a route direction in the three-dimensional design data, (c) the terminal control unit setting a first measurement point in the three-dimensional design data, (d) the terminal control unit making the position acquiring device acquire position coordinates of the worker, (e) the terminal control unit guiding the worker to the first measurement point, (f) the terminal control unit making the position acquiring device acquire position coordinates of the worker at the first measurement point, (g) the terminal control unit setting a not-yet-measured measurement point nearest from a current position of the worker in the set advancing direction of observation as a second measurement point, (h) the terminal control unit guiding the worker to the second measurement point and (i) after the step (h), while successively replacing a next measurement point with a further next measurement point such as reading the first measurement point as the second measurement point and reading the second measurement point as a third measurement point, repeating the steps (f) to (h) and guiding the worker to a remaining measurement point. The cross-sectional direction in the advancing direction of observation is a direction of a series of observations with which making advancement in a direction of a point nearest from a start point along a cross-section, making movement to a nearest cross-section when all points on the cross-section are measured, and making advancement along the cross-section are repeated, and the route direction in the advancing direction of observation is a direction of a series of observations with which making advancement in a direction of a point nearest from a start point along a route, making movement to a nearest point along the same cross-section when all constituent points on the same line are measured, and making advancement along the route are repeated, and during observation, by pressing a guidance point switching button which is displayed on the terminal display unit together with the three-dimensional design data, the worker sets a measurement point nearest from the current position of the worker as the first measurement point irrespective of the advancing direction of observation, and executes the steps (d) to (i).

In the above aspect, it is also preferable that in the step (b), the advancing direction of observation is settable by the worker pressing an advancing direction switching button which is displayed on the terminal display unit together with the three-dimensional design data.

Further, in the above aspect, it is also preferable that during observation, the advancing direction of observation is switchable at any time by the worker pressing the advancing direction switching button which is displayed on the terminal display unit together with the three-dimensional design data.

Further, in the above aspect, it is also preferable that the step (c) is executed after the step (d), and in the step (c), the terminal control unit sets a point nearest from the worker whose position coordinates are acquired in the step (d) as the first measurement point.

Further, in the above aspect, it is also preferable that the position acquiring device includes a target configured to be held by the worker, and a surveying instrument configured to send a distance-measuring light to the target, receive a reflected light from the target, and measure a distance and an angle to the target. The terminal control unit acquires position coordinates of the worker based on measurement data which is obtained by measuring the distance and the angle to the target held by the worker.

Further, in the above aspect, it is also preferable that the surveying instrument includes a guide light irradiating unit that is configured to emit two color guide lights to enable identification of a horizontal direction with respect to a collimation axis of the surveying instrument and enable identification of a position in a collimation axis direction with respect to the collimation axis of the surveying instrument. In the steps (e) and (h), the terminal control unit performs the guidance by making the surveying instrument collimate the first measurement point or the second measurement point which is a guidance destination by a collimation axis and making the surveying instrument drive the guide light irradiating unit.

Further, in the above aspect, it is also preferable that the position acquiring device is a GNSS device configured to be held by the worker, the GNSS device being capable of acquiring its own position based on a navigation signal.

Further, in the above aspect, it is also preferable that, in the steps (e) and (h), the terminal control unit makes the position acquiring device acquire position coordinates of the worker, the terminal control unit calculates a distance and a direction from the worker to the first measurement point or the second measurement point serving as a guidance destination, and the terminal control unit displays a compass display according to the distance and the direction on the terminal display unit.

Further, a survey system according to another aspect of the present invention is a mobile terminal includes a mobile terminal including a terminal communication unit capable of communicating with the position acquiring device configured to be capable of acquiring position coordinates of a worker, a terminal operation unit, a terminal display unit, and a terminal control unit including at least one processor and at least one memory. The terminal control unit is configured to read three-dimensional design data including a plurality of center points which are set at predetermined intervals on a centerline of a route, and a plurality of measurement points which are set on a cross-section passing through the center points, the cross-section being orthogonal to the centerline, and display on the terminal display unit, set an advancing direction of observation to a cross-sectional direction or a route direction in the three-dimensional design data, set a first measurement point in the three-dimensional design data, make the position acquiring device installed at a known point acquire position coordinates of the worker, guide the worker to the first measurement point, make the position acquiring device acquire position coordinates of the worker at the first measurement point, set a not-yet-measured measurement point nearest from a current position of the worker in the set advancing direction of observation as a second measurement point, guide the worker to the second measurement point, and after that, repeat acquisition of position coordinates of the worker at the second measurement point, setting of a next measurement point, and guidance of the worker to the next measurement point while successively replacing the next measurement point with a further next measurement point, and execute observation of a remaining measurement point. The cross-sectional direction in the advancing direction of observation is a direction of a series of observations with which making advancement in a direction of a point nearest from a start point along a cross-section, making movement to a nearest cross-section when all points on the cross-section are measured, and making advancement along the cross-section are repeated, and the route direction in the advancing direction of observation is a direction of a series of observations with which making advancement in a direction of a point nearest from a start point along a route, making movement to a nearest point along the same cross-section when all constituent points on the same line are measured, and making advancement along the route are repeated, and during observation, by pressing a guidance point switching button which is displayed on the terminal display unit together with the three-dimensional design data, the worker sets a measurement point nearest from the current position of the worker as the first measurement point irrespective of the advancing direction of observation.

Further, a survey system according to still another aspect of the present invention is a survey system including a position acquiring device configured to be capable of acquiring position coordinates of a worker, the position acquiring device including a communication unit; and a mobile terminal in the above aspect.

Further, a program according to still another aspect of the present invention is a computer-readable storage medium including a program to make a computer terminal including a terminal communication unit capable of communicating with a position acquiring device which is configured to acquire position coordinates of a worker, the position acquiring device including a communication unit, a terminal display unit, a terminal operation unit, and a terminal control unit including a processor and a memory execute the steps of (j) the terminal control unit reading three-dimensional design data including a plurality of center points which are set at predetermined intervals on a centerline of a route, and a plurality of measurement points which are set on a cross-section passing through the center points, the cross-section being orthogonal to the centerline, and displays on the terminal display unit, (k) the terminal control unit setting an advancing direction of observation to a cross-sectional direction or a route direction in the three-dimensional design data, the terminal control unit setting a first measurement point in the three-dimensional design data, (m) the terminal control unit making the position acquiring device acquire position coordinates of the worker, (n) the terminal control unit guiding the worker to the first measurement point, (o) the terminal control unit making the position acquiring device acquire position coordinates of the worker at the first measurement point, (p) the terminal control unit setting a not-yet-measured measurement point nearest from a current position of the worker in the set advancing direction of observation as a second measurement point, (q) the terminal control unit guiding the worker to the second measurement point, and (r) after the step (q), while successively replacing a next measurement point with a further next measurement point such as reading the first measurement point as the second measurement point and reading the second measurement point as a third measurement point, the steps (l) to (q) are repeated, and the worker is guided to a remaining measurement point, wherein the cross-sectional direction in the advancing direction of observation is a direction of a series of observations with which making advancement in a direction of a point nearest from a start point along a cross-section, making movement to a nearest cross-section when all points on the cross-section are measured, and making advancement along the cross-section are repeated, and the route direction in the advancing direction of observation is a direction of a series of observations with which making advancement in a direction of a point nearest from a start point along a route, making movement to a nearest point along the same cross-section when all constituent points on the same line are measured, and making advancement along the route are repeated, and during observation, by the worker pressing a guidance point switching button which is displayed on the terminal display unit together with the three-dimensional design data, the terminal control unit sets a measurement point nearest from the current position of the worker as the first measurement point irrespective of the advancing direction of observation, and executes the steps (m) to (r).

Benefit of Invention

With the survey method, the survey system, and the program according to the above aspects, only by performing an easy operation of setting a start point and an advancing direction, it is possible to successively guide the worker to a next measurement point, and execute efficient cross-sectional surveying or observation of a managed section as-built part in accordance with a landform.

BRIEF DESCRIPTION OF DRAWINGS

FIGS. 6A to 6D are views illustrating examples of a display of the mobile terminal of the same survey system.

FIG. 15 is a schematic external appearance view of a survey system according to a fourth embodiment of the present invention.

FIG. 16 is a configuration block diagram of the same survey system.

DESCRIPTION OF EMBODIMENT(S)

Hereinafter, preferred embodiments of the present invention will be described with reference to the drawings, however, the present invention is not limited to these. In the embodiments, members having the same functions and configurations will be provided with the same reference signs, members having corresponding functions will be given the same names, and overlapping description will be omitted as appropriate.

First Embodiment (Entire Configuration of System)

Figure 1A:
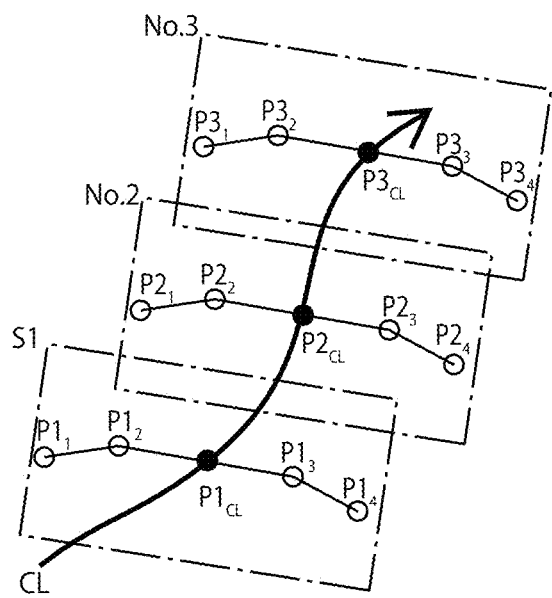
FIG. 1A is a view schematically illustrating three-dimensional design data of a site where a height difference is small.
Figure 1B:
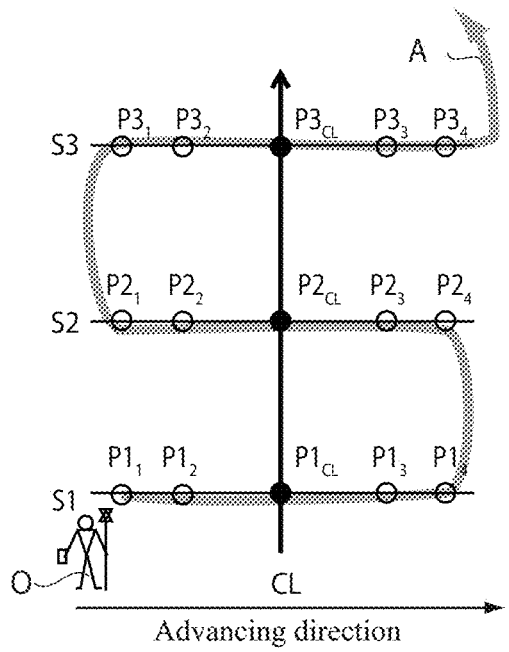
FIG. 1B is a view illustrating a conventional observation method.
Figure 1C:
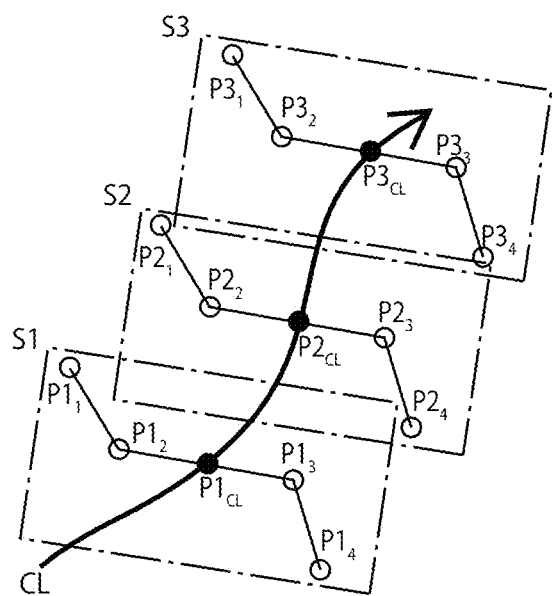
FIG. 1C is a view schematically illustrating three-dimensional design data of a site where a height difference is large.
Figure 1D:
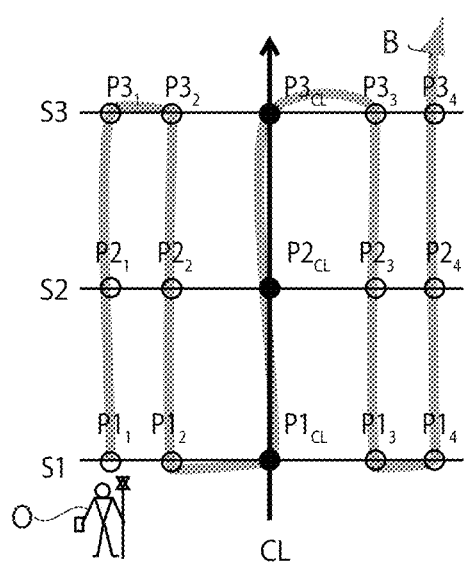
FIG. 1D is a view illustrating a preferable observation method.
Figure 2:
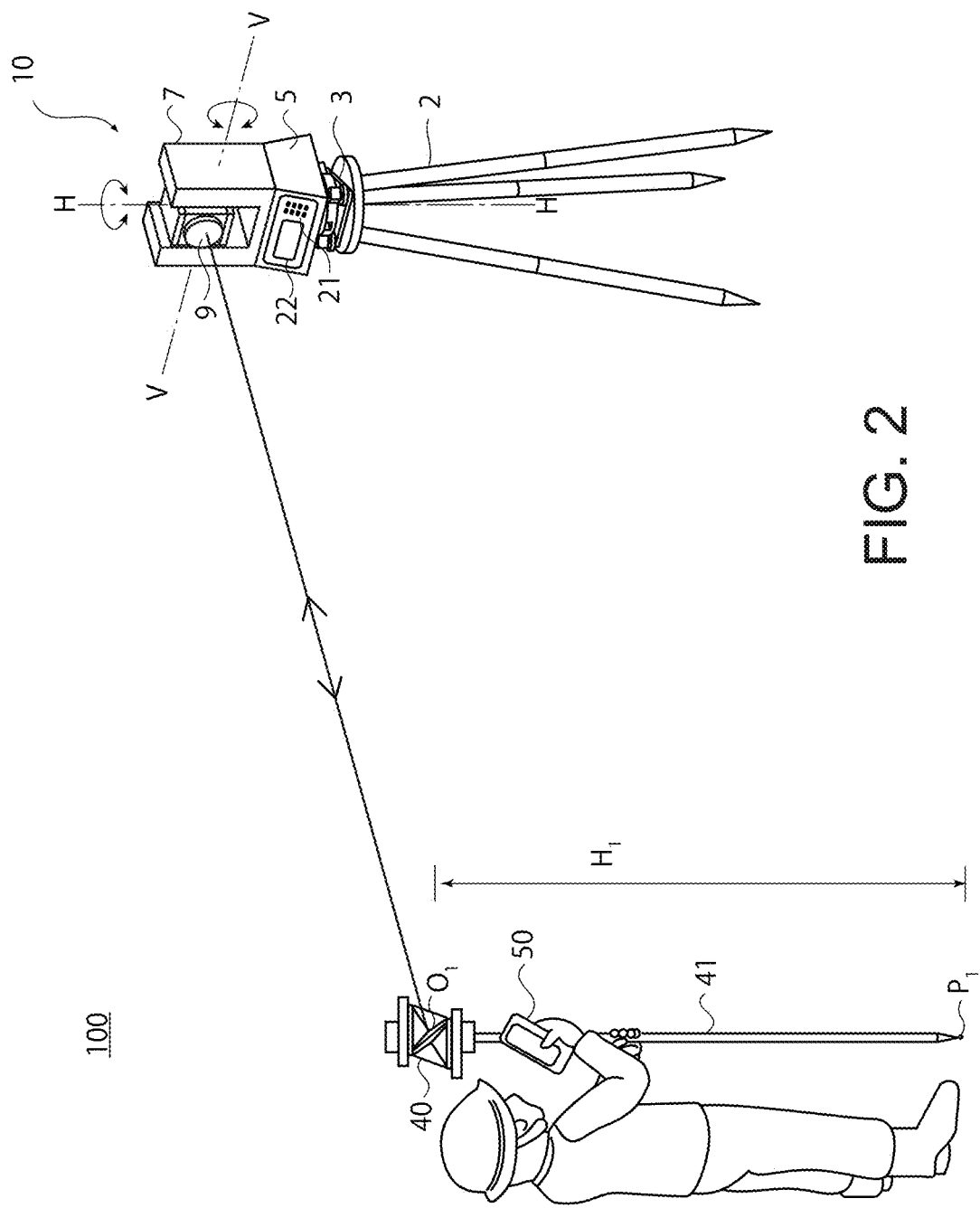
FIG. 2 is an overall schematic view of a survey system according to a first embodiment.
Figure 3:
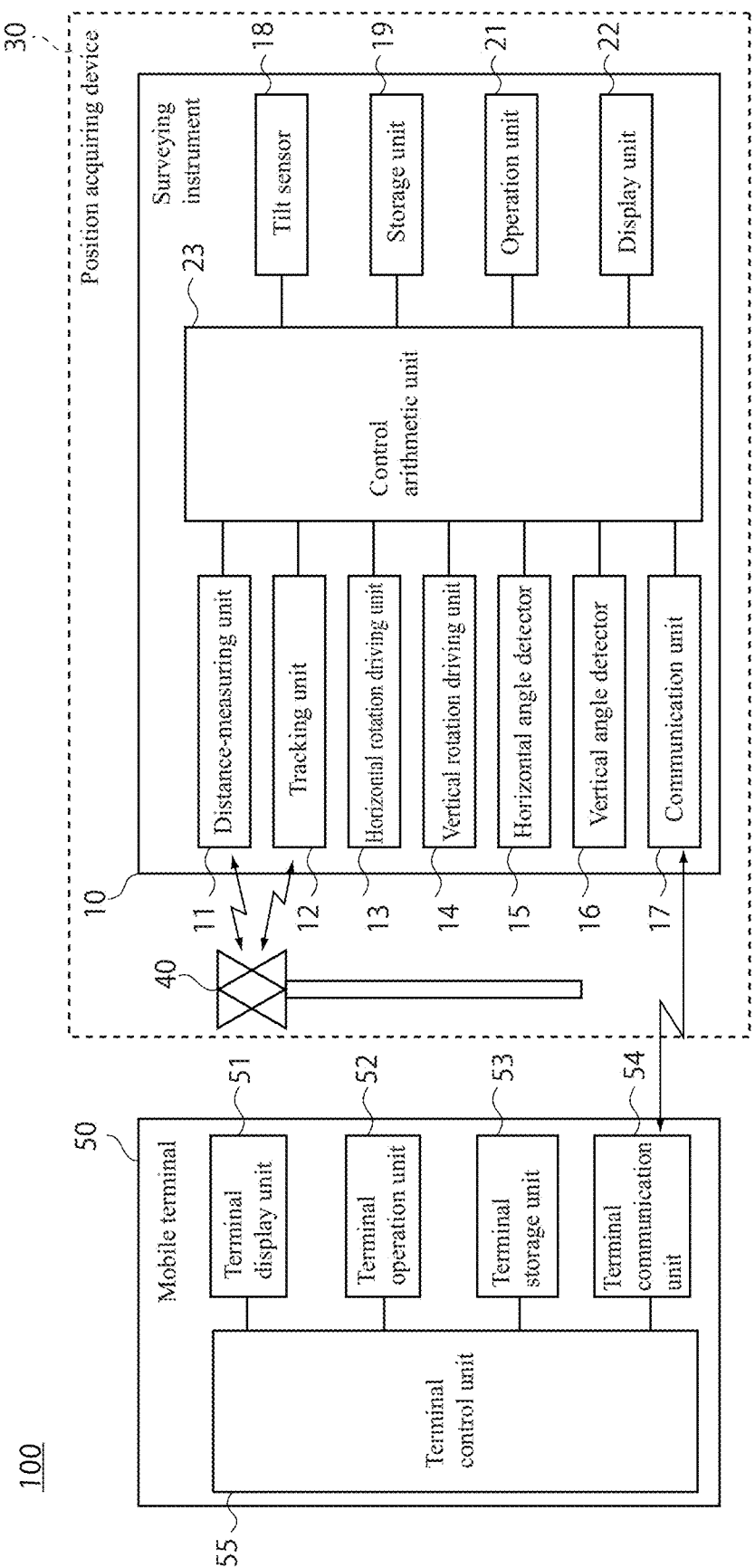
FIG. 3 is a configuration block diagram of the same survey system.

FIG. 2 is an overall schematic view of a survey system (hereinafter, simply referred to as the "system") 100 according to a first embodiment of the present invention. FIG. 3 is a configuration block diagram of the system 100. The system 100 includes a position acquiring device 30 and a mobile terminal 50.

(Configuration of Position Acquiring Device 30)

The position acquiring device 30 is configured by a surveying instrument 10 and a target 40.

The surveying instrument 10 is a total station (electronic distance-measuring and angle-measuring instrument). The surveying instrument 10 is installed at a known point via a tripod 2. In the present specification, the expression "the surveying instrument is installed at a known point" includes not only "installing at a point whose coordinates are known" but also that installing at a point whose coordinates will be known by, for example, a backward intersection method, or the like after the surveying instrument 10 is installed. Coordinate data of the surveying instrument 10 is input into the mobile terminal 50 and stored in a terminal storage unit 53.

The surveying instrument 10 has, in appearance, a base portion 5 provided on a leveling unit 3, a bracket portion 7 to be rotated horizontally around an axis H-H on the base portion 5, and a telescope 9 to be rotated vertically around an axis V-V on the bracket portion 7. The bracket portion 7 accommodates a control arithmetic unit 23 to be described later.

The surveying instrument 10 includes an automatic collimation function and an automatic tracking function, and the telescope 9 accommodates an optical distance-measuring system and an optical tracking system (not illustrated). Configurations of the optical distance-measuring system and the optical tracking system are conventionally publicly known. In the surveying instrument 10, by cooperation of horizontal rotation of the bracket portion 7 and vertical rotation of the telescope 9, a distance-measuring light and a tracking light can be irradiated over the entire circumference.

As illustrated in FIG. 3, the surveying instrument 10 includes a distance-measuring unit 11, a tracking unit 12, a horizontal rotation driving unit 13, a vertical rotation driving unit 14, a horizontal angle detector 15, a vertical angle detector 16, a communication unit 17, a tilt sensor 18, a storage unit 19, an operation unit 21, a display unit 22, and the control arithmetic unit 23.

The distance-measuring unit 11 emits a distance-measuring light by using the optical distance-measuring system, receives a reflected light from the target 40 to collimate and measure a distance to the target 40.

The tracking unit 12 emits a tracking light by using the optical tracking system, captures a position of the target 40 from a reflected light from the target 40, and in a case where the target 40 is moved, automatically tracks the target 40.

The horizontal rotation driving unit 13 is a motor provided in the base portion 5. The horizontal rotation driving unit 13 rotates the bracket portion 7 around the axis H-H with respect to the base portion 5. The vertical rotation driving unit 14 is a motor provided in the bracket portion 7. The vertical rotation driving unit 14 rotates the telescope 9 around the axis V-V.

The horizontal angle detector 15 and the vertical angle detector 16 are rotary encoders. The horizontal angle detector 15 detects an angle of the bracket portion 7 around the axis H-H, and the vertical angle detector 16 detects an angle of the telescope 9 around the axis V-V. As a result, the horizontal angle detector 15 and the vertical angle detector 16 constitutes an angle-measuring unit that measures an angle to the target 40.

The communication unit 17 is a communication control device that connects the surveying instrument 10 and the mobile terminal 50 by wire or wirelessly. As a communications standard to realize the communication unit 17, Wi-Fi (registered trademark) as one of wireless LAN standards or 4G (fourth-generation mobile communications system) may be adopted. Alternatively, a short-range wireless communications standard such as Bluetooth (registered trademark) and infrared communication may be adopted.

The tilt sensor 18 is a tilt sensor of a bubble tube type, a capacitance type, etc., and is fixed on an upper surface of a rotation shaft (not illustrated) of the base portion 5. A value of the tilt sensor 18 when a rotation shaft of the horizontal rotation driving unit 13 is once rotated forward and backward is read, and based on a gap amount of forward and backward rotations, horizontalness of the leveling unit 3 is adjusted.

The storage unit 19 is a storage medium that memorizes, stores, and transmits information in a form with which the control arithmetic unit 23 is capable of processing, and for example, an HDD (Hard Disc Drive), a flash memory, etc. is adopted. In the storage unit 19, the measured survey data and a program for various processing are stored.

The operation unit 21 is a plurality of buttons provided on an outer surface of the bracket portion 7. Various information relating to actions of the surveying instrument 10 can be input via the operation unit 21.

The display unit 22 is a liquid crystal display provided on the outer surface of the bracket portion 7, and displays various information relating to surveying.

The control arithmetic unit 23 is a microcomputer for which a CPU (Central Processing Unit), a ROM (Read Only Memory), a RAM (Random Access Memory), etc. are mounted on an integrated circuit. The control arithmetic unit 23 is connected to the units of the surveying instrument 10. The control arithmetic unit 23 reads the program for executing various functions of the surveying instrument 10 from the storage unit 19 or the RAM, controls the units of the surveying instrument 10 to execute various functions such as automatic tracking, distance measurement, and angle measurement. The control arithmetic unit 23 performs arithmetic processing on data obtained by distance measurement, angle measurement, etc. The control arithmetic unit 23 communicates with the mobile terminal 50 via the communication unit 17, executes processing following a command of the mobile terminal 50, and sends data to the mobile terminal 50.

The target 40 is a so-called 360-degree prism configured by radially combining a plurality of triangular-pyramid-shaped prisms, however, the present invention is not limited to this. The target 40 reflects incident light in a direction opposite to an incident direction.

The target 40 includes a support member 41 whose length $H_1$ to center $O_1$ is known. The support member 41 includes a level (not illustrated), so as to be installed vertically. By measuring the distance and the angle to the target 40 installed vertically at a measurement point via the support member 41 by the surveying instrument 10 installed at a known point, it is possible to determine three-dimensional coordinates of the center $O_1$. By using the length $H_1$, it is possible to determine three-dimensional coordinates of an installation point $P_1$.

(Configuration of Mobile Terminal 50)

The mobile terminal 50 is a so-called computer terminal such as a mobile phone, a smartphone, a tablet computer, a PDA, or a data collector.

The mobile terminal 50 includes a terminal display unit 51, a terminal operation unit 52 as an input device, the terminal storage unit 53, a terminal communication unit 54, and a terminal control unit 55.

The terminal display unit 51 is a touch-panel type liquid crystal display integrated with the terminal operation unit 52, however, the terminal display unit 51 and the terminal operation unit 52 may be provided separately. The terminal display unit 51 displays screens according to a work content, and the screens are switched according to the work content.

The terminal storage unit 53 is a storage device including a computer-readable storage medium, for example, an HDD. In the terminal storage unit 53, a communication program, an image display program for displaying the work content, etc. and a communication content, etc. on the display unit, various programs for executing cross-sectional surveying and observation of a managed section as-built part, etc. are stored.

In the terminal storage unit 53, various information relating to surveying such as coordinates of the surveying instrument 10 and a height of the target 40 are also stored. Distance measurement data and angle measurement data received from the surveying instrument 10 are also stored.

The terminal communication unit 54 is a communication control device capable of wirelessly communicating with the surveying instrument 10 via the communication unit 17 of the surveying instrument 10, and uses the same communications standard as the communication unit 17.

The terminal control unit 55 is a control unit including at least one processor (a CPU) and at least one memory, etc. The terminal control unit 55 controls the mobile terminal 50 and the surveying instrument 10 based on an input signal from the terminal communication unit 54, the terminal operation unit 52, etc. The terminal control unit 55 calls and executes a program stored in the terminal storage unit 53 to the memory, the program for executing a survey method to be described later.

(Survey Method 1)

Figure 4:
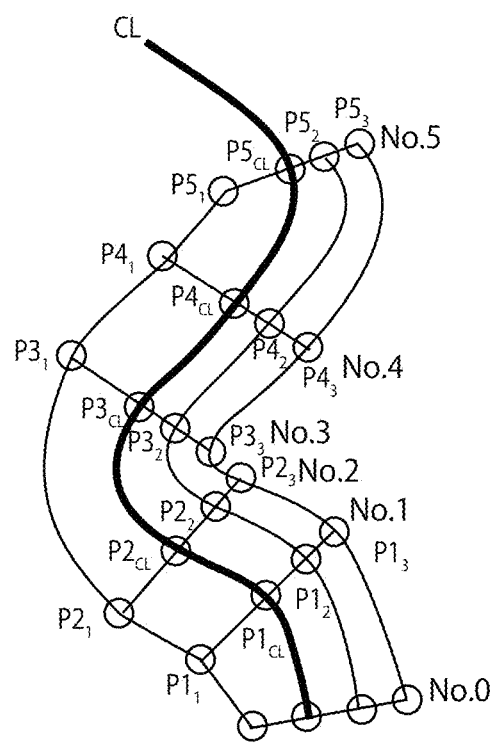
FIG. 4 is a view illustrating an example of three-dimensional design data used in a survey method using the same survey system.
Figure 5:
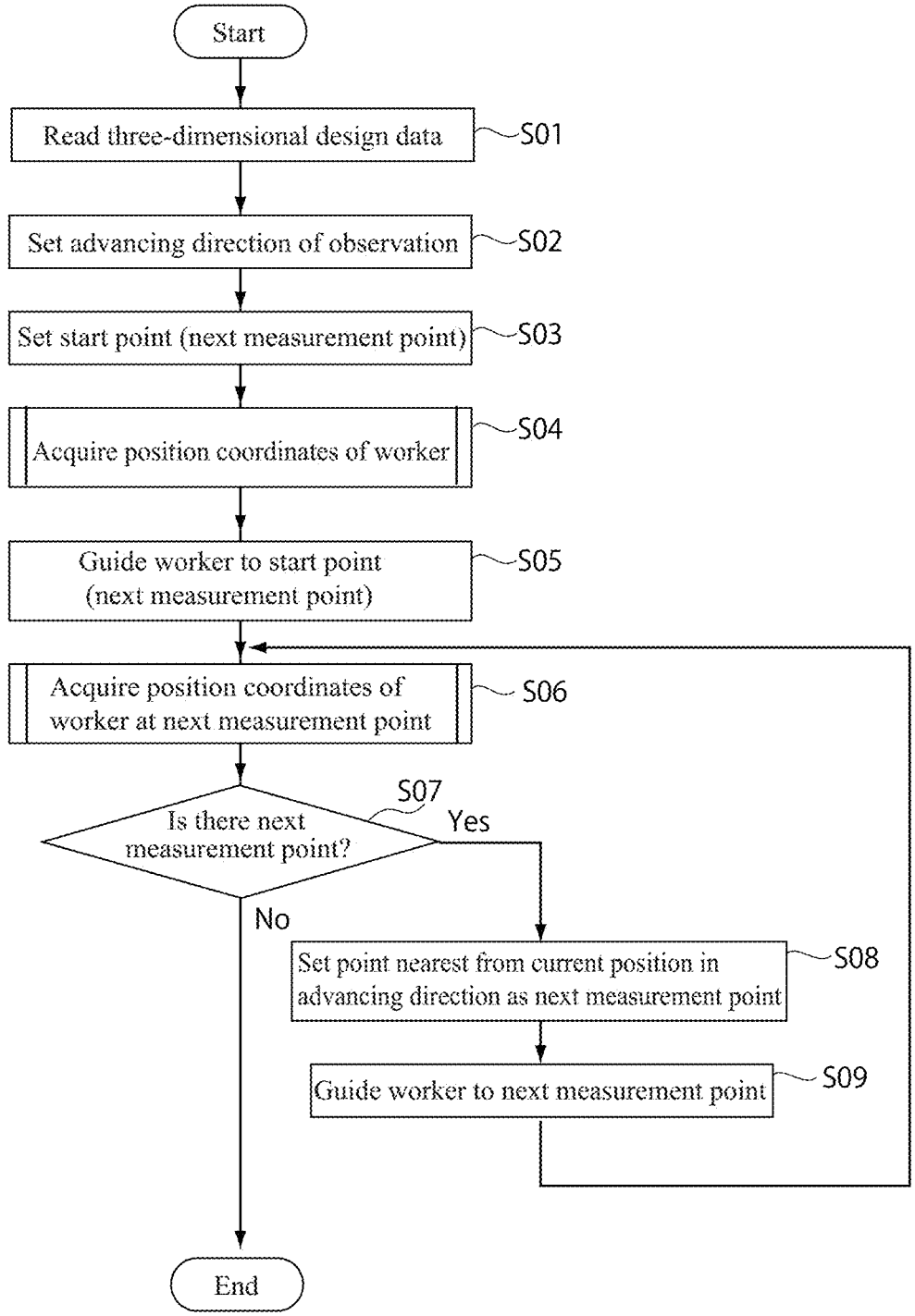
FIG. 5 is a flowchart of processing of a mobile terminal in a survey method 1 using the same survey system.

Next, a survey method 1 using the system 100 will be described. FIG. 4 illustrates three-dimensional design data of a work range to be described as an example. FIG. 5 is a flowchart of processing of the mobile terminal 50 at the time of implementing the survey method 1. FIG. 6 illustrates examples of a screen displayed on the terminal display unit 51.

First, as illustrated in FIG. 4, three-dimensional design data including a plurality of center points $P1_{CL}$, $P2_{CL}$, . . . set at predetermined intervals on a centerline CL of a route, and a plurality of measurement points $P1_1$, $P1_2$, . . . , $P2_1$, $P2_2$, . . . set on cross-sections No. 1, No. 2, . . . passing through the center points, the cross-sections being orthogonal to the centerline is prepared.

Next, in a site, the surveying instrument 10 is installed at a known point where the entire work range is overlooked.

Then, a worker turns the automatic tracking function of the surveying instrument 10 ON, and starts observation with the target 40 and the mobile terminal 50 held. Thereby, the surveying instrument 10 continues to automatically track the target 40 held by the worker during the work.

When observation is started, first, in Step S01, the terminal control unit 55 reads the three-dimensional design data. The three-dimensional design data may be stored in the terminal storage unit 53 in advance, or may be received from the surveying instrument 10. As illustrated in FIG. 6A, three-dimensional design data 61 is displayed on the terminal display unit 51. Further, on the terminal display unit 51, various information such as a cross-sectional view 62, and an advancing direction switching button 63 (63a, 63b) indicating the selected advancing direction of observation are displayed. Reference sign 64 denotes a current position mark of the target.

Next, in Step S02, by pressing the advancing direction switching button 63 from the terminal display unit 51 and the terminal operation unit 52, the worker switches a cross-sectional direction 63a and a route direction 63b, and inputs the advancing direction. Thereby, the terminal control unit 55 sets the selected advancing direction.

Figure 7A:
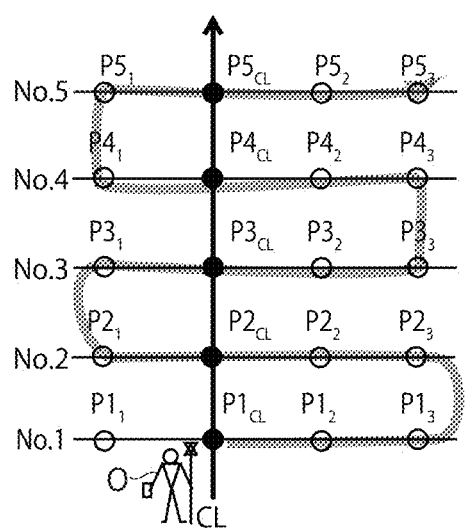
FIGS. 7A and 7B are views illustrating setting of an observation direction in the same survey method.

When the cross-sectional direction is selected, as illustrated in FIG. 7A, measurement advances in order from a point nearest from a start point (for example, the point $P1_{CL}$ on the section No. 1) serving as a first measurement point set in the next Step S03 in the cross-sectional direction, and when all points on the section are measured, moves to the nearest section (No. 2), and this is repeated.

Figure 7B:
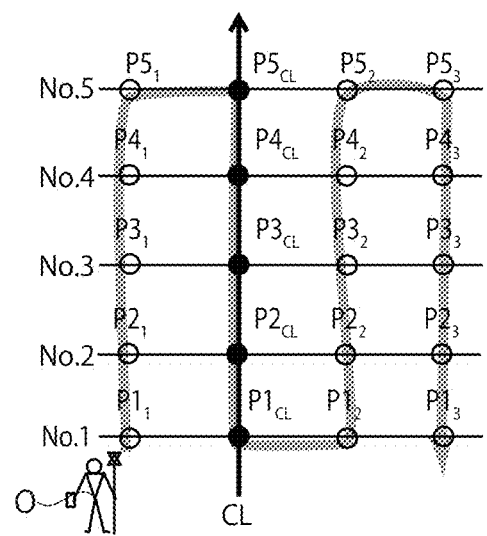

On the other hand, when the route direction is selected, as illustrated in FIG. 7B, measurement advances over the sections from a start point (for example, the point $P1_1$ on the section No. 1) set in the next Step S03, and moves to the nearest constituent point (point $P2_1$ in this case). Measurement then advances in order from the nearest point in the route direction, and when all constituent points on the same line are measured, moves to the nearest point in the cross-sectional direction on the same section, and further advances in a direction opposite to the route direction.

The worker is able to judge and select a direction with which a work is efficiently performed from a landform and conditions of the site. It is assumed that the cross-sectional direction is set in this case.

Next, in Step S03, by selecting an arbitrary point from the terminal display unit 51 and the terminal operation unit 52, the worker designates the start point (for example, $P1_{CL}$, the same applies hereinafter) as the first measurement point. In accordance with this, the terminal control unit 55 sets the start point, and displays a next measurement point mark 65 on the terminal display unit 51.

Next, in Step S04, the mobile terminal 50 makes the surveying instrument 10 acquire position coordinates of the worker. It is possible to regard position coordinates of the target 40 as the position coordinates of the worker.

Figure 8:
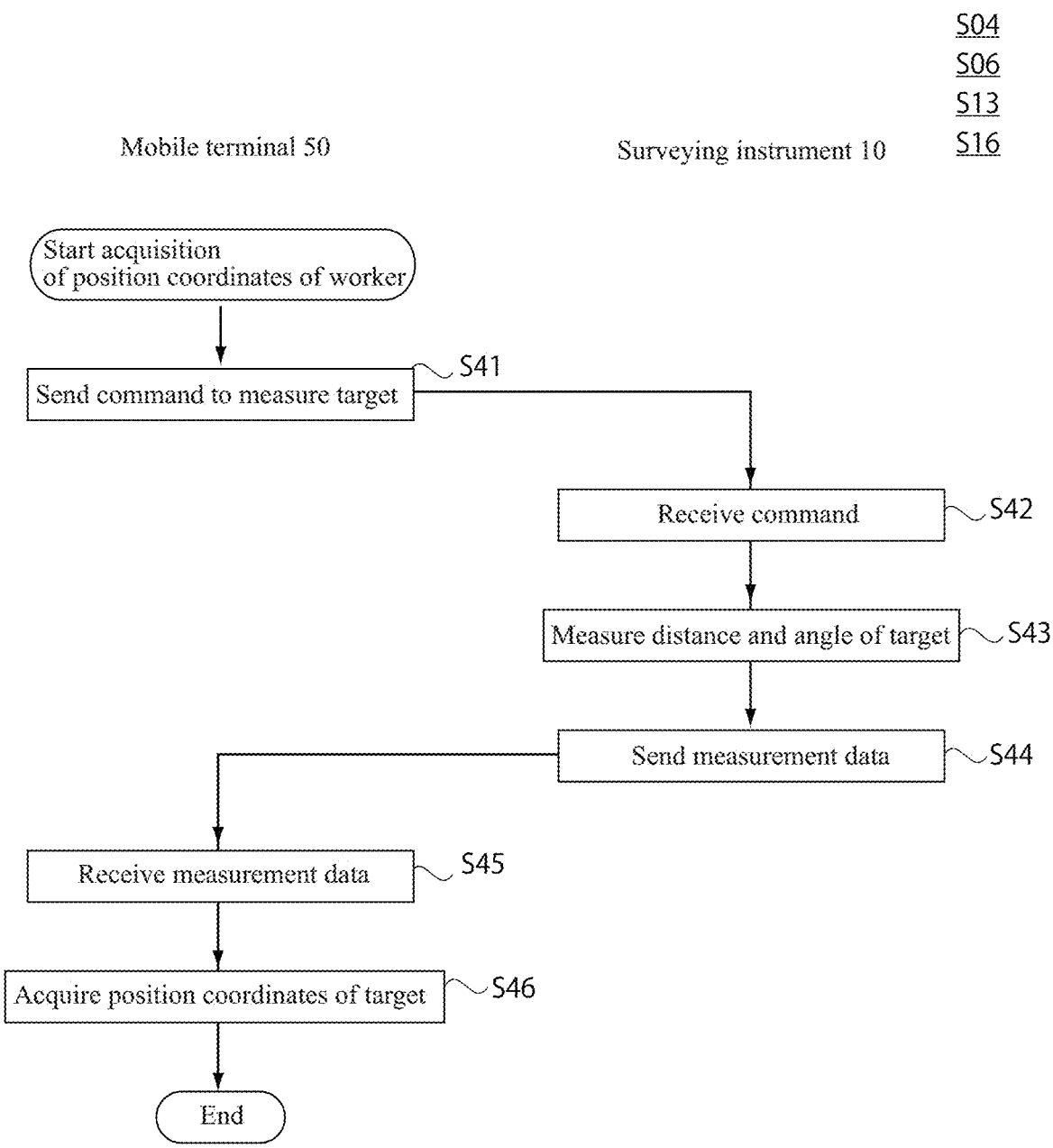
FIG. 8 is a detailed flowchart of measurement of a target in the same survey method.

FIG. 8 is a detailed flowchart of Step S04. When acquisition of the position coordinates is started, in Step S41, the terminal control unit 55 sends a command to measure the target 40 to the surveying instrument 10. When receiving the command in Step S42, the surveying instrument 10 measures (measures the distance and the angle of) the target 40 which is being tracked in response to the command in Step S43. Next, the surveying instrument 10 sends measurement data to the mobile terminal 50 in Step S44, and the mobile terminal 50 receives the measurement data and stores it in the terminal storage unit 53 in Step S45.

Next, in Step S46, the terminal control unit 55 calculates and acquires the position coordinates of the target 40 from the measurement data. Alternatively, the terminal control unit 55 makes the control arithmetic unit 23 of the surveying instrument 10 calculate the position coordinates of the target 40 from the distance measurement and angle measurement data and send it to the mobile terminal 50 as the measurement data. The mobile terminal 50 receives the measurement data and acquires the position coordinates of the target 40.

In the system 100, when the mobile terminal 50 acquires the position coordinates of the target 40, the terminal display unit 51 updates the current position mark 64.

Next, in Step S05, the mobile terminal 50 guides the worker to the start point (next measurement point) set in Step S03.

Figure 9:
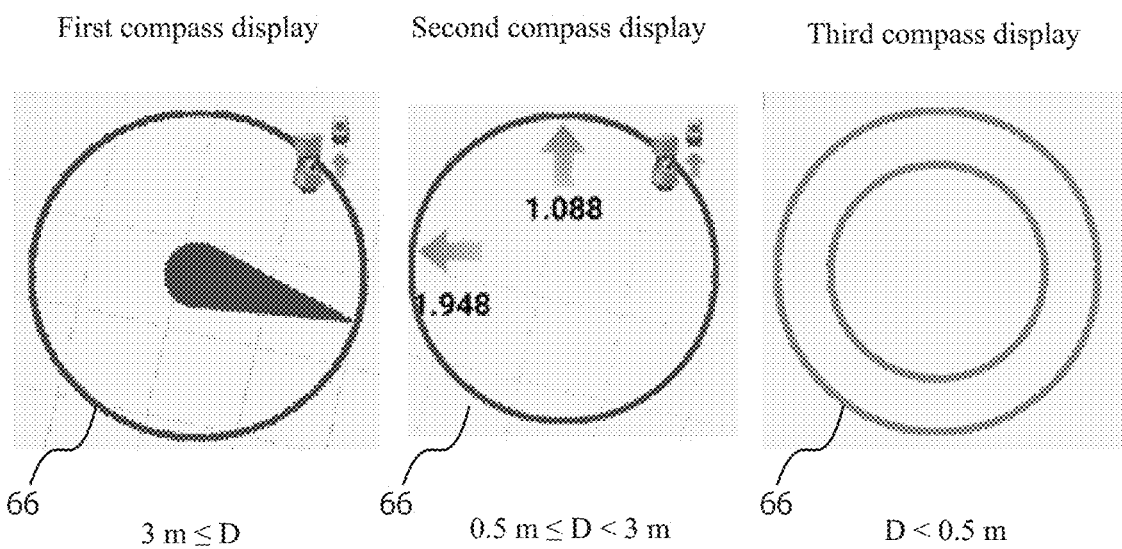
FIG. 9 is a view illustrating examples of a guidance display in the same survey method.

Guidance of the worker is performed by displaying a compass display 66 for guidance illustrated in FIG. 9 on the terminal display unit 51. Specifically, when guidance is started, the mobile terminal 50 always repeats the action of Step S04, which makes the surveying instrument 10 measure the distance and the angle to the target and monitor the position coordinates of the target.

Next, the terminal control unit 55 calculates a distance D between the start point (next measurement point) and a current position of the target 40 and a direction of the start point from the target 40 for each set of the acquired position coordinates. In a case where the distance D is not less than a predetermined upper limit value (for example, 3 m), the terminal control unit 55 displays a first compass display 66 on the terminal display unit 51. The first compass display 66 indicates a direction toward the start point in a red circle depicting a compass, for example. Thereby, while holding the target 40, the worker can come close to the set start point only by moving following the first compass display 66.

Then, in a case where the distance D is not less than a predetermined lower limit value (for example, 0.5 m) and less than the predetermined upper limit value (for example, 3 m), a second compass display 66 is displayed on the terminal display unit 51. The second compass display 66 indicates an arrow indicating a direction toward the start point and a distance value for each direction in a red circle depicting a compass, for example. Thereby, the worker can precisely come close to the start point without overshooting in a state of clearly bearing a sense of distance.

Then, when the distance D is less than the predetermined lower limit value (for example, 0.5 m), the terminal control unit 55 displays a third compass display 66 on the terminal display unit 51. The third compass display 66 is, for example, a green double circle indicating an OK-state where guidance is completed. The worker moves from a current position to the next measurement point (start point) while holding the target 40, and installs the target 40 at the start point.

FIG. 6D illustrates the compass display 66 displayed together with the three-dimensional design data 61 on the terminal display unit 51. In this way, the current position mark 64, the next measurement point mark 65, and the compass display 66 are displayed overlapping the three-dimensional design data 61 indicating the site. Thereby, the worker can intuitively understand the current position, a guidance destination, and a direction to move, and smoothly move to the next measurement point. The three-dimensional design data 61 and the compass display 66 are displayed according to an orientation of the mobile terminal 50 based on a detection result of an electronic compass (not illustrated) incorporated in the mobile terminal 50, for example.

When guidance is completed, in step S06, in the same manner as in Step S04, the terminal control unit 55 makes the surveying instrument 10 measure the distance and the angle to the target 40 installed at the measurement point $P1_1$ as the current position of the worker at the next measurement point $P1_{CL}$, and acquires the position coordinates of the target 40 (that is, the position coordinates of the worker at the measurement point Plc). The acquired position coordinates are stored in the terminal storage unit 53.

Then, the terminal control unit 55 changes a point display of the measurement point of the three-dimensional design data, for example, from an open circle to a colored circle (see FIGS. 6B, 6C). Thereby, the worker can grasp the status of progress of observation in one glance. Thus, convenience is improved.

Next, in Step S07, the terminal control unit 55 judges whether there is a not-yet-measured measurement point (next measurement point) within the work range.

In a case where there is a not-yet-measured measurement point (Yes), in Step S08, the terminal control unit 55 sets a not-yet-measured measurement point (point $P1_2$) nearest from the current position of the target 40, that is, the point $P1_{CL}$ in the cross-sectional direction which is the advancing direction of observation as the next measurement point (second measurement point). Specifically, the terminal control unit 55 extracts measurement points close to the current position of the worker in the advancing direction of observation, calculates a distance between each of the measurement points and the current position of the worker, and sets the measurement point with the shortest distance as the next measurement point.

Next, in Step S09, in the same manner as in Step S05, the terminal control unit 55 guides the worker further to the next measurement point (point $P1_2$).

Then, returning to Step S06, Steps S06 to S09 are repeated until no not-yet-measured measurement point is left in Step S07. On the other hand, in Step S06, in a case where no not-yet-measured measurement point is left (No), observation is finished.

In the present survey method, by the worker only setting the advancing direction of observation and the start point serving as the first measurement point by the mobile terminal 50, the mobile terminal 50 guides the worker to the first measurement point and performs measurement of the first measurement point. The mobile terminal 50 then sets the point nearest from the first measurement point in the advancing direction of observation as the second measurement point and guides the worker to the second measurement point. Therefore, the worker does not have to perform a work of setting a cross-section for each measurement point. Thus, a work becomes simple and convenient.

Further, between the measurement points, the worker can efficiently move to the next measurement point only by moving simply following the guidance of the mobile terminal 50. Thus, it is possible to reduce a work burden on the worker and reduce loss of time.

Further, the mobile terminal 50 displays the compass display 66 according to the distance to the guidance destination together with the three-dimensional design data 61 on the terminal display unit 51 to guide the worker. Thereby, the worker can move while intuitively and clearly recognizing the distance and the direction to the target measurement point. Thus, workability is improved.

(Survey Method 2)

Figure 10:
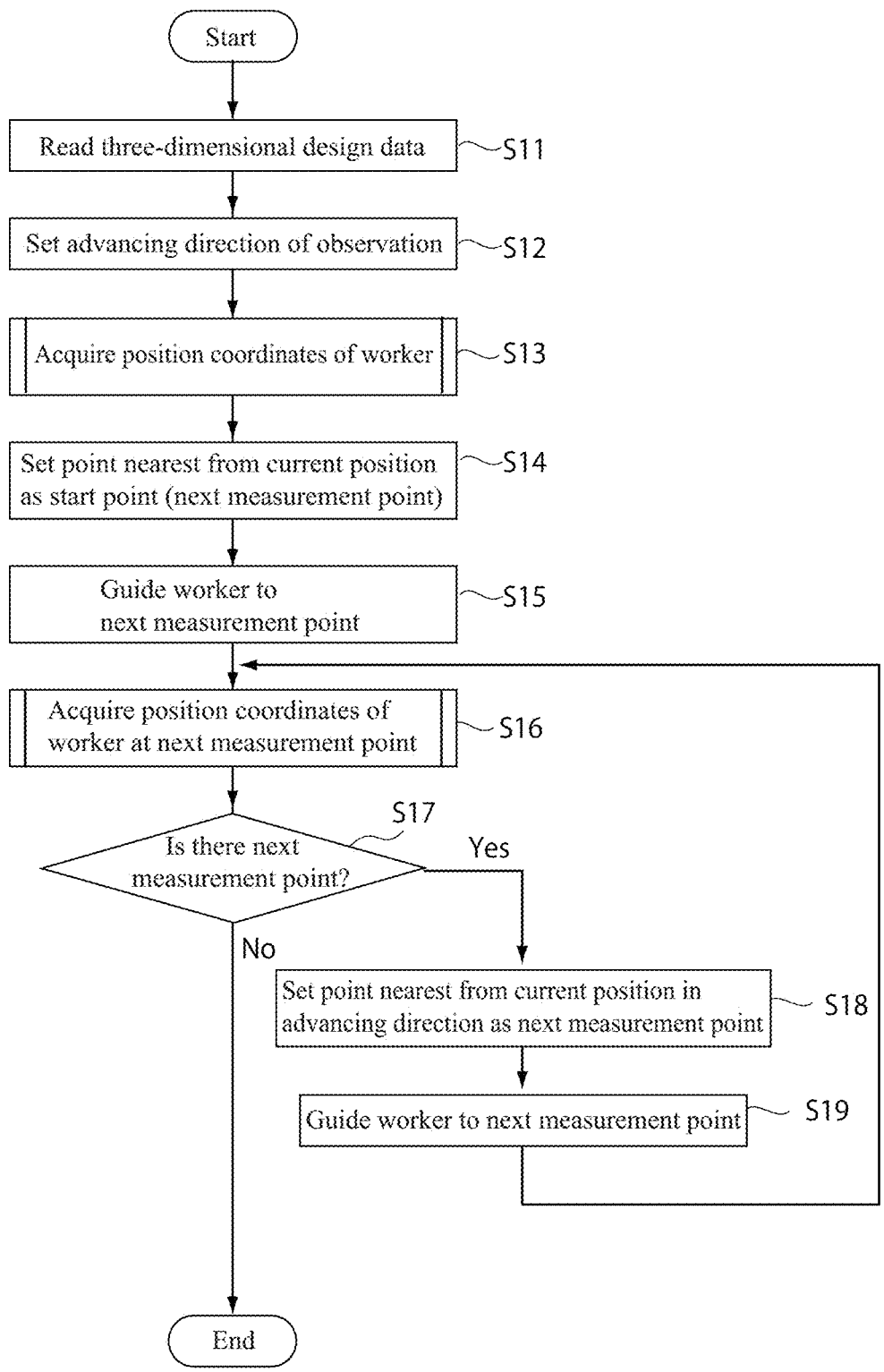
FIG. 10 is a flowchart of processing of the mobile terminal in a survey method 2 using the same survey system.

Next, a survey method 2 using the system 100 will be described. FIG. 10 is a flowchart of processing of the mobile terminal 50 at the time of implementing the survey method 2. Conditions of a work range, etc. are the same as those used in the description of the survey method 1.

However, in the survey method 1, the worker sets the start point by inputting the start point serving as the first measurement point from the terminal operation unit 52, whereas in the survey method 2, a current position of a worker is acquired and a point nearest from the current position of the worker is set as a start point.

Specifically, in Steps S11 and S12, in the same manner as in Steps S01 and S02, the terminal control unit 55 reads three-dimensional design data and sets an advancing direction of observation.

Next, in Step S13, in the same manner as in Step S04, the terminal control unit 55 makes the surveying instrument 10 perform measurement of the target 40, so as to acquire position coordinates of the target 40 as position coordinates of the worker.

Next, in Step S14, the terminal control unit 55 sets a measurement point nearest from the current position of the worker as a start point (next measurement point) serving as a first measurement point. After that, in Steps S16 to S19, observation is performed in the same manner as in Steps S06 to S09, and processing is continued until all measurement points are observed.

In this way, in the survey method 2, the position acquiring device 30 acquires the current position of the worker, and the measurement point nearest from the current position of the worker is automatically set as the start point (first measurement point). Then, by setting a point nearest from the worker at the measurement point in the set advancing direction of observation as a next measurement point (second measurement point), and successively repeating guidance and measurement, the worker can proceed with observation by an efficient route only by continuing observation following the guidance without being particularly conscious of his/her own position or which section is being measured.

In the present method, for example, during the work, by pressing the advancing direction switching button 63 (63a, 63b), processing may be configured to be started from Step S12 while holding the three-dimensional design data.

Figure 11A:
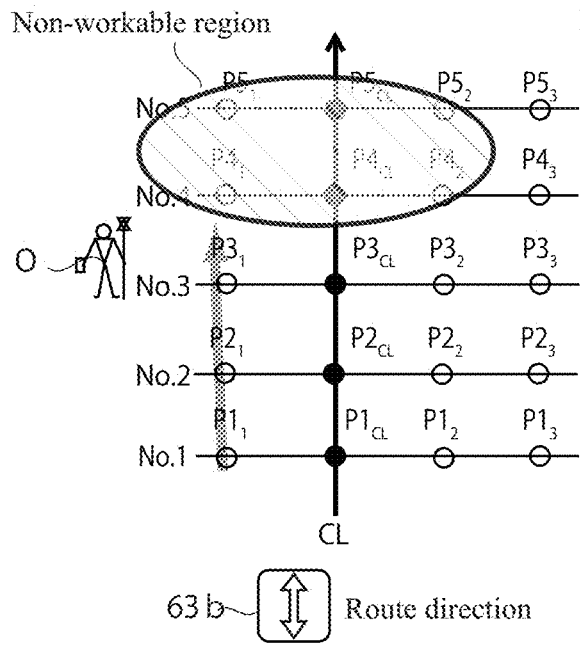
FIGS. 11A to 11C are views each illustrating an example of utilization of the survey method 2.
Figure 11B:
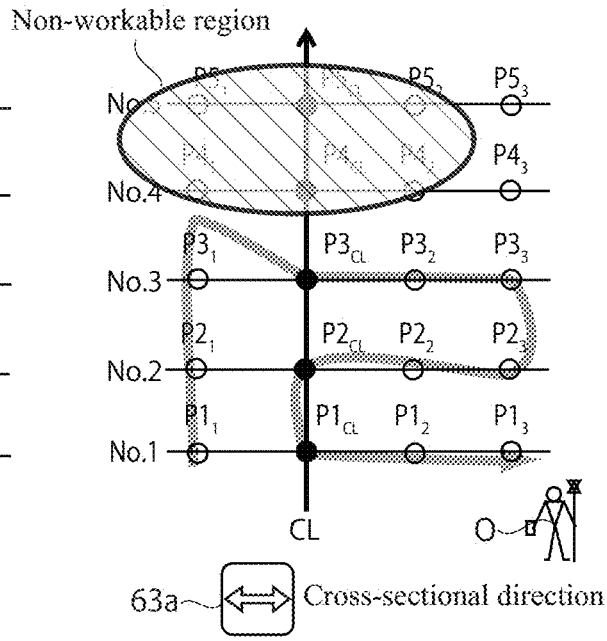

Specifically, as illustrated in FIG. 11A, it is assumed that the worker is performing observation from a measurement point $P1_1$ in a route direction following guidance. After measuring a measurement point $P3_1$, in a case where a worker O is about to be guided to a non-workable region due to a heavy machine being temporarily in operation, etc., by pressing the advancing direction switching button 63 on the scene, the worker O sets the advancing direction of observation to the cross-sectional direction, and sets a point $P3_{CL}$ nearest from the current position of the worker as the next measurement point as illustrated in FIG. 11B. After that, the worker O continues observation in the cross-sectional direction to $P3_2$, $P3_1$, . . . . The same also applies to the survey method 1. In this way, when the advancing direction of observation is configured to be switchable at any time during observation, it is possible not only to avoid wasteful waiting time but also to efficiently continue observation without a need for performing complicated setting.

Figure 11C:
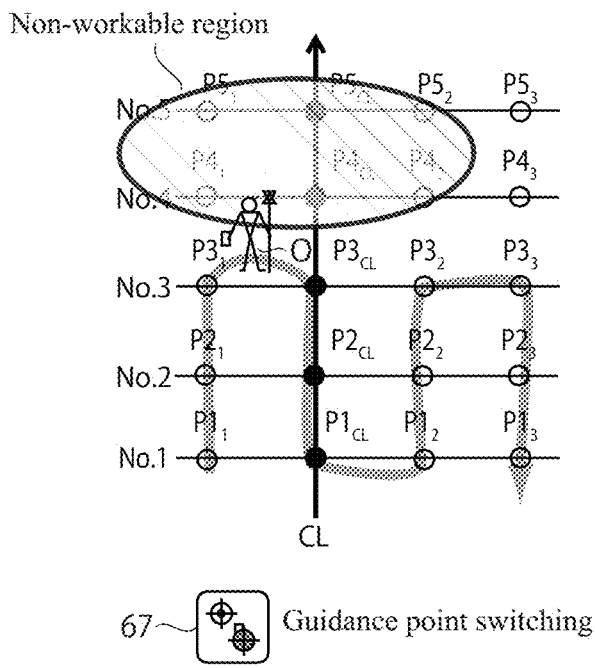

Further, in the present method, as illustrated in FIGS. 6A to 6D, by providing a guidance point switching button 67 in the display unit and pressing the guidance point switching button 67, processing may be configured to be started from Step S13 while holding the current three-dimensional design data. Specifically, it is assumed that observation is being performed as illustrated in FIG. 11A, which is the same as with the above description. After measuring the measurement point $P3_1$, in a case where the worker O is about to be guided to the non-workable region, by moving to avoid the non-workable region and pressing the guidance point switching button 67, the worker O sets the point $P3_{CL}$ nearest from the current position of the worker irrespective of the advancing direction as the next measurement point as illustrated in FIG. 11C, and after that, continues observation in the route direction to the point $P2_{CL}$, $P1_{CL}$, . . . .

In this way, by configuring a guidance point (next measurement point) to be settable at any time during observation, it is possible to avoid wasteful waiting time and efficiently continue observation without a need for performing complicated setting. This is particularly advantageous in a case where there are a plurality of not-yet-measured measurement points nearest in the set observation direction or in a case where a point other than a next measurement point (guidance point) set by the mobile terminal 50 is required to be the next measurement point.

The survey method 1, 2 can be applied to route survey setting by installing stakes and rivets at the measurement points, and can be applied to observation of a managed section as-built part after route construction by performing measurement of the measurement points.

Second Embodiment

Figure 12:
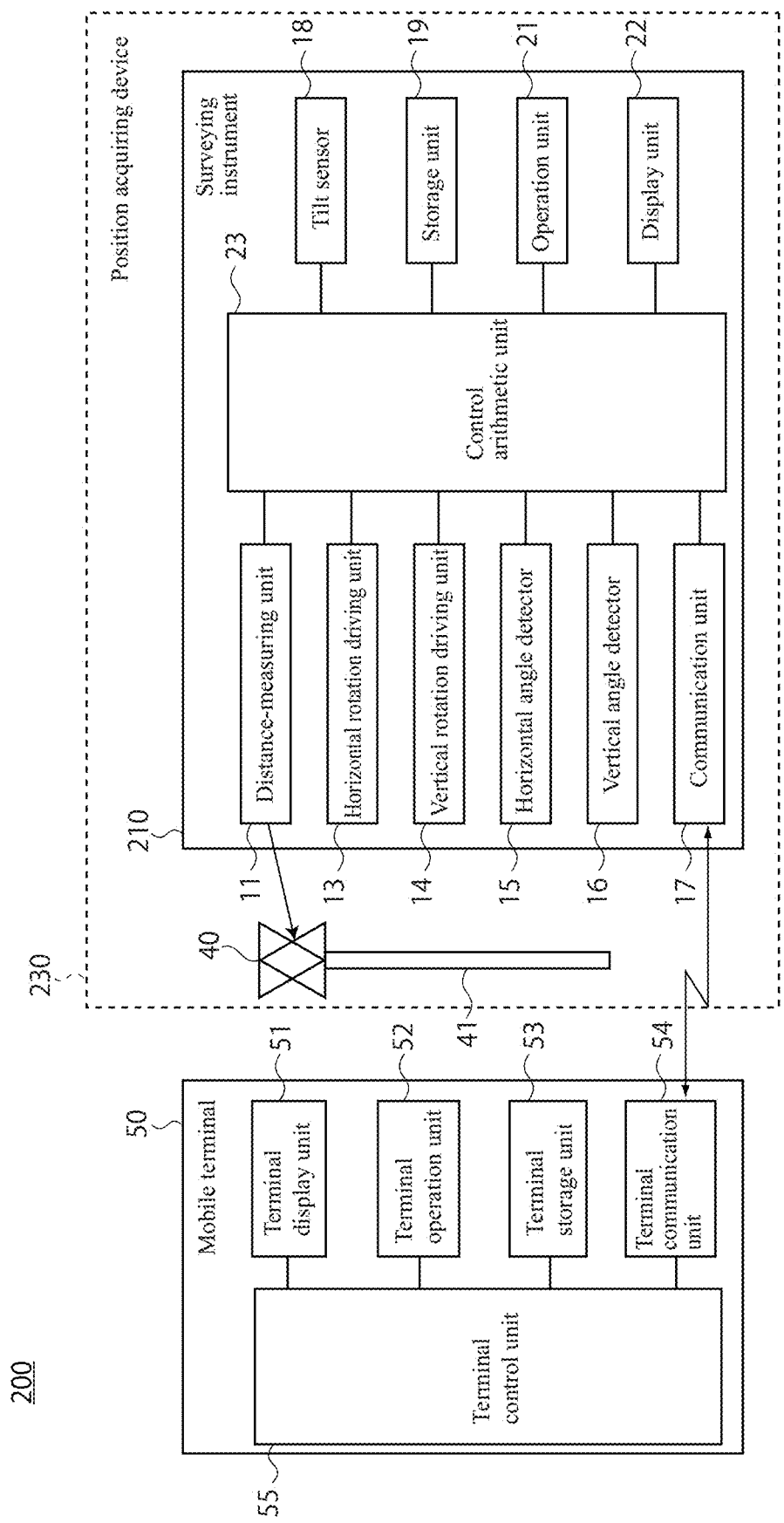
FIG. 12 is a configuration block diagram of a survey system according to a second embodiment of the present invention.

FIG. 12 is a configuration block diagram of a survey system 200 according to a second embodiment. The system 200 has roughly the same configuration as the system 100 but is different in the point that a surveying instrument 210 of a position acquiring device 230 does not include a tracking unit 12.

In a case of using the system 200, observation is performed by two workers including a target side worker who holds a target 40 and moves over measurement points and a surveying instrument side worker who operates the surveying instrument.

Actions of a mobile terminal 50 in survey methods 1 and 2 using the system 200 are roughly the same but different in the point that the surveying instrument 210 does not perform automatic collimation of the target 40. Specifically, in processing of acquisition of position coordinates in Steps S04, S06, S13, S16 and guidance (Steps S05, S09, S15, S19), actions at the time of making the surveying instrument 210 measure a distance and an angle to the target 40 are different.

Figure 13:
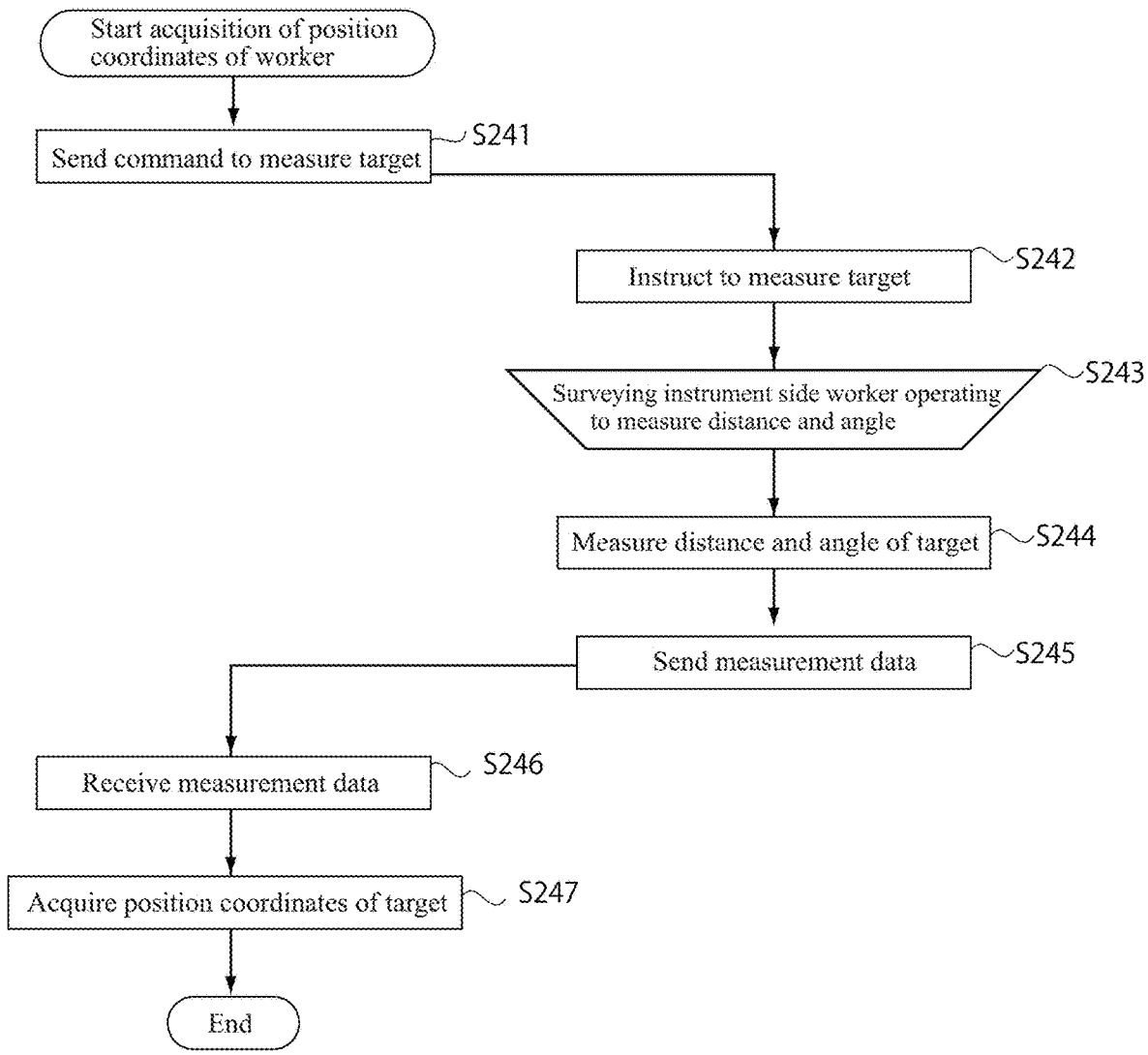
FIG. 13 is a flowchart of measurement of a target in a survey method using the same survey system.

FIG. 13 illustrates the actions of the system 200 when making the position acquiring device 230 acquire position coordinates of the worker (target 40) at the time of acquisition of the position coordinates and guidance.

When started, in Step S241, a terminal control unit 55 sends a target measurement command to the surveying instrument 210. At the same time, the terminal control unit 55 may display that the measurement command is being sent on a terminal display unit 51 to inform the target side worker that the measurement command is being issued. Next, in Step S242, the surveying instrument 210 displays on a display unit 22 a message to request the surveying instrument side worker for measurement of the target 40 in response to the command.

Next, in Step S243, the surveying instrument side worker operates the surveying instrument 210 following the message, and then in Step S244, the surveying instrument 210 measures the distance and the angle to the target. Next, in Step S245, the surveying instrument 210 sends measurement data to the mobile terminal 50.

Then, in Step S246, when the mobile terminal 50 receives the measurement data, the terminal control unit 55 stores the measurement data in a terminal storage unit 53. Next, in Step S247, the terminal control unit 55 calculates and acquires the position coordinates of the target 40 as position coordinates of the worker from the measurement data.

Therefore, with the system 200, even in a case where the surveying instrument 210 does not include a tracking unit 12, it is possible to provide the same effect as with the system 100 by cooperation of two workers.

Third Embodiment

Figure 14:
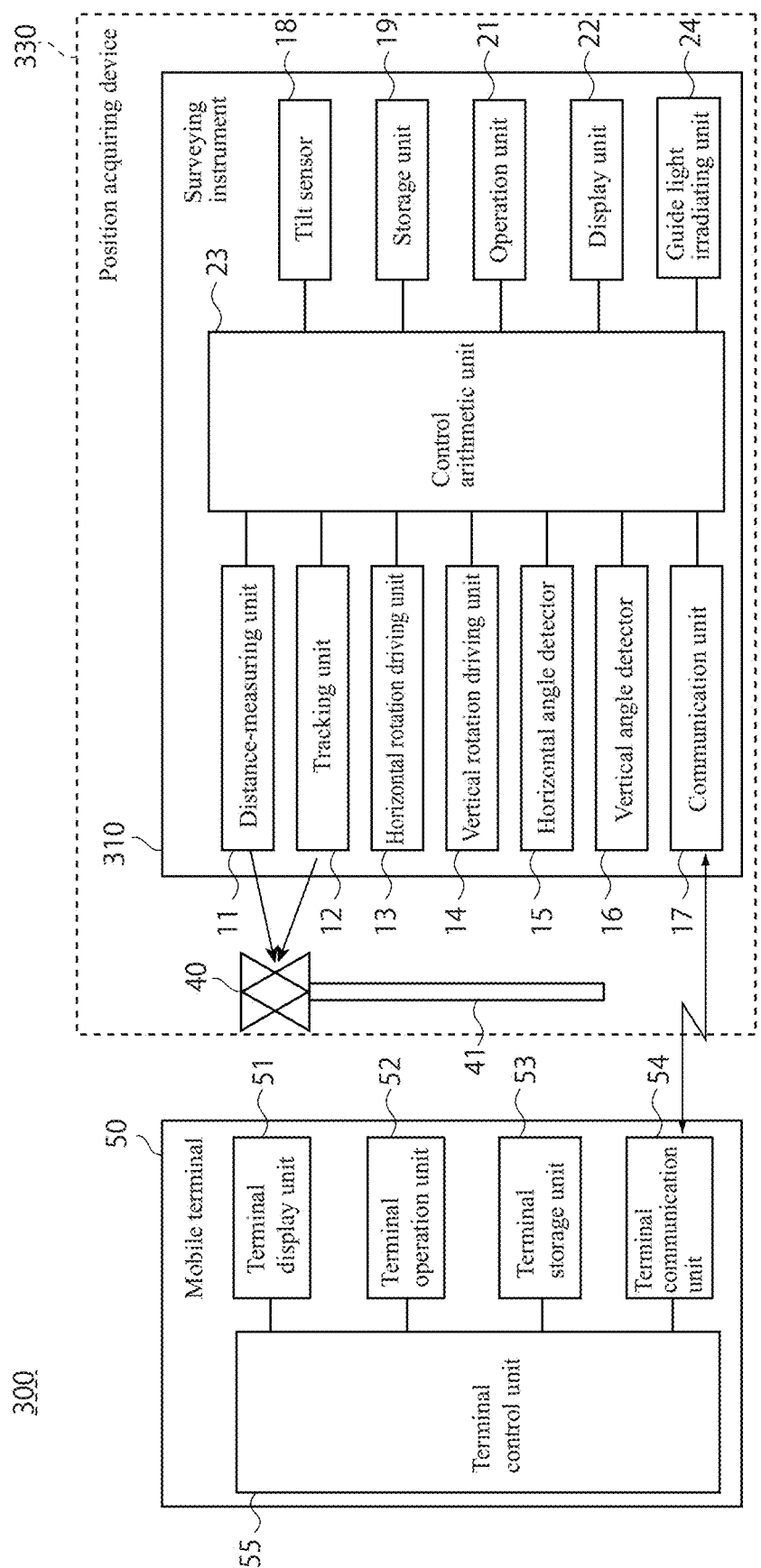
FIG. 14 is a configuration block diagram of a survey system according to a third embodiment of the present invention.

FIG. 14 is a configuration block diagram of a surveying system 300 according to a third embodiment. The system 300 has roughly the same configuration as the system 100 but is different in the point that a surveying instrument 310 of a position acquiring device 330 further includes a guide light irradiating unit 24.

The guide light irradiating unit 24 is disposed in the surveying instrument 310 to match a collimation axis of the surveying instrument 310 in a horizontal direction. The guide light irradiating unit 24 is configured to emit two color guide lights which are different on the left and the right of the collimation axis (for example, red and green visible lights) to enable identification of the horizontal direction with respect to the collimation axis of the surveying instrument and enable identification of a position in a collimation axis direction with respect to the collimation axis of the surveying instrument. As a result, by setting guidance points and irradiating the guide lights, it is possible to guide a worker to a predetermined guidance point. As such a guide light irradiating unit 24, various configurations are publicly known, and for example, it is possible to apply a configuration disclosed in Patent Literature 2.

Then, light emission of the guide light irradiating unit 24 is controlled by control of a control arithmetic unit 23. The worker holding the target 40 moves to a set next measurement point while confirming the guide lights.

Therefore, in survey methods 1 and 2 using the system 300, guidance of the worker corresponding to Steps S05, S09, S15, S19 is performed by sending information of the next measurement point as a guidance destination and a guidance command to the surveying instrument 310 from a mobile terminal 50, and making the surveying instrument 310 follow the command to collimate the next measurement point, drive the guide light irradiating unit 24, and control irradiation of the guide lights.

In this way, even when guidance of the worker is performed by a guide light function of the surveying instrument 310, it is possible to provide the same effect as in the first embodiment with which only by moving following the guidance, the worker can perform efficient observation in accordance with a landform without performing a complicated operation.

Fourth Embodiment

FIG. 15 is a schematic external appearance view of a survey system 400 according to a fourth embodiment. FIG. 16 is a configuration block diagram of the system 400.

The system 400 includes a position acquiring device 430 and a mobile terminal 450. The position acquiring device 430 is a GNSS (Global Navigation Satellite System) device 80.

As illustrated in FIG. 16, the GNSS device 80 includes a GNSS receiver 81 and a communication unit 83.

The GNSS receiver 81 is an integrated antenna type navigation signal receiving device. The GNSS receiver 81 is able to acquire a position of its own by receiving a navigation signal issued from a navigation satellite, measuring a sending time of the navigation signal, and measuring the position. The GNSS receiver 81 coverts the received navigation signal to an electric signal, and outputs it to the mobile terminal 50 via the communication unit 83 and a terminal communication unit 454 to be described later as position measurement data.

The GNSS receiver 81 is supported on a surface in an upper end of a pole-shaped support member 84 having a known length $H_2$, the surface being orthogonal to the support member 84. By vertically supporting the support member 84 and measuring the position in a state where the GNSS receiver 81 is horizontally supported, a worker can acquire three-dimensional coordinates of a reference point $O_2$ of the GNSS receiver 81.

In order to make the GNSS receiver 81 horizontal, for example, a level can be provided on the support member 84, or as disclosed in Patent Literature 3, the GNSS device 80 can be configured to include a tilt sensor.

The communication unit 83 is a communication control device that connects the GNSS receiver 81 and the mobile terminal 540 by wire or wirelessly. As a communications standard to realize the communication unit 83, a short-range wireless communications standard such as Bluetooth (registered trademark) and infrared communication may be adopted. Alternatively, Wi-Fi (registered trademark) as one of wireless LAN standards or 4G (fourth-generation mobile communications system) may be adopted.

(Configuration of Mobile Terminal 450)

The mobile terminal 450 is a computer terminal that is the same as the mobile terminal 50. The mobile terminal 450 includes a terminal display unit 51, a terminal operation unit 52, a terminal storage unit 453, a terminal communication unit 454, and a terminal control unit 455.

In the terminal storage unit 453, a program to communicate with the GNSS device 80, various programs for controlling the GNSS device 80 and executing route survey setting and observation of a managed section as-built part, a program for controlling a display of the terminal display unit 51, etc. are stored. The terminal storage unit 453 stores position measurement data received from the GNSS device 80 and various data obtained by arithmetic processing.

The terminal communication unit 454 is a communication control device capable of communicating with the GNSS device 80 by wire or wirelessly via the communication unit 83 of the GNSS device 80, and uses the same communications standard as the communication unit 83.

The terminal control unit 455 is a control unit having the same configuration as the terminal control unit 55. The terminal control unit 455 controls the mobile terminal 450 and the GNSS device 80 based on an input signal from the terminal communication unit 454, the terminal operation unit 52, etc. Further, the terminal control unit 455 reads out various programs stored in the terminal storage unit 453 into a memory, and executes a survey method for route survey setting and observation of a managed section as-built part. The terminal control unit 455 acquires three-dimensional position coordinates of the reference point $O_2$ of the GNSS device 80 as position coordinates of the worker based on the position measurement data received from the GNSS device 80. By the worker inputting a length $H_2$ of the support member 84 into the mobile terminal 450, coordinates of an installation point $P_2$ of the GNSS device 80 can be calculated.

In a case where the survey method 1, 2 described in the first embodiment is executed by using the system 400, instead of the worker holding a target 40 and moving over measurement points, the worker holds the GNSS device 80 and moves over the measurement points. Then, in acquisition of the position coordinates of the worker in Steps S04, S06, S13, S16 and guidance of the worker (Steps S05, S09, S15, S19), the mobile terminal 450 makes the GNSS device 80 measure the position instead of making a surveying instrument 10 measure the target 40, and calculates position coordinates of the reference point $O_2$ of the GNSS device as the position coordinates of the worker based on the position measurement data.

In this way, even in a case where the position acquiring device is the GNSS device, it is possible to execute the same survey method 1, 2 as the system 100, and provide the same effect as with the system 100.

All or at least part of the steps configuring the methods according to the embodiments of the present invention can be realized by arbitrary hardware (such as a processor, a storage device, and an input/output device), software, or combination of the hardware and the software. The programs and the data for executing the methods according to the embodiments are stored in a computer-readable storage device (storage medium). The storage device includes an optical disc, a magnetic disk, a magnetooptical disc, a semiconductor memory, etc., however, the present invention is not limited to these.

Further, with reference to the detailed description, etc. of the invention of the present application, a person skilled in the art is able to implement the methods according to the embodiments based on ordinary skill in the art (such as knowledge of basic circuit design and basic programming technique).

While preferred embodiments of the present invention have been described above, the embodiments described above are just examples of the present invention, and can be combined based on the knowledge of a person skilled in the art, and such a combined embodiment is also included in the scope of the present invention.

REFERENCE SIGNS LIST

10: Surveying instrument
30: Position acquiring device
17: Communication unit (of surveying instrument)
21: Operation unit
22: Display unit
24: Guide light irradiating unit
40: Target
50: Mobile terminal
51: Terminal display unit
52: Terminal operation unit
53: Terminal storage unit
54: Terminal communication unit
55: Terminal control unit
80: GNSS device
83: Communication unit (of GNSS device)
100: Survey system
200: Survey system
210: Surveying instrument
230: Position acquiring device
300: Survey system
310: Surveying instrument
330: Position acquiring device
400: Survey system
430: Position acquiring device
450: Mobile terminal
454: Terminal communication unit
455: Terminal control unit

The invention claimed is:

1. A survey method using:
a position acquiring device configured to acquire position coordinates of a worker, the position acquiring device including a communication unit; and
a mobile terminal including a terminal communication unit communicating with the position acquiring device, a terminal display unit, a terminal operation unit, and a terminal control unit including at least one processor and at least one memory,
the survey method comprising the steps of:
(a) the terminal control unit reading three-dimensional design data including a plurality of center points which are set at predetermined intervals on a centerline of a route, and a plurality of measurement points which are set on a cross-section passing through the center points, the cross-section being orthogonal to the centerline, and displayed on the terminal display unit;
(b) the terminal control unit setting an advancing direction of observation to a cross-sectional direction or a route direction in the three-dimensional design data;
(c) the terminal control unit setting a first measurement point in the three-dimensional design data;
(d) the terminal control unit making the position acquiring device acquire position coordinates of the worker;
(e) the terminal control unit guiding the worker to the first measurement point;
(f) the terminal control unit making the position acquiring device acquire position coordinates of the worker at the first measurement point;
(g) the terminal control unit setting a not-yet-measured measurement point nearest from a current position of the worker in the set advancing direction of observation as a next measurement point;
(h) the terminal control unit guiding the worker to the next measurement point; and
(i) successively replacing the measurement point in the step (f) with the measurement point that the worker has been guided to and repeating the steps (f) to (h) until there are no more not-yet-measured measurement points, wherein
the cross-sectional direction in the advancing direction of observation is a direction of a series of observations with which making advancement in a direction of a point nearest from a start point along a cross-section, making movement to a nearest cross-section when all points on the cross-section are measured, and making advancement along the cross-section are repeated, and the route direction in the advancing direction of observation is a direction of a series of observations with which making advancement in a direction of a point nearest from a start point along a route, making movement to a nearest point along the same cross-section when all constituent points on a same line extending parallel to the centerline are measured, and making advancement along the route are repeated, and
during observation, by the worker pressing a guidance point switching button which is displayed on the terminal display unit together with the three-dimensional design data, the terminal control unit sets a measurement point nearest from the current position of the worker as the first measurement point irrespective of the advancing direction of observation, and executes the steps (d) to (i).

2. The method according to claim 1, wherein in the step (b), the advancing direction of observation is set by pressing an advancing direction switching button which is displayed on the terminal display unit together with the three-dimensional design data.

3. The method according to claim 1, wherein during observation, the advancing direction of observation is switched at any time by pressing the advancing direction switching button which is displayed on the terminal display unit together with the three-dimensional design data.

4. The method according to claim 1, wherein the step (c) is executed after the step (d), such that the terminal control unit sets the first measurement point as a not-yet-measured measuring point nearest to the worker whose position coordinates are acquired in the step (d).

5. The method according to claim 1, wherein the position acquiring device includes: a target configured to be held by the worker; and a surveying instrument configured to send a distance-measuring light to the target, receive a reflected light from the target, and measure a distance and an angle to the target, and the terminal control unit acquires position coordinates of the worker based on measurement data which is obtained by measuring the distance and the angle to the target held by the worker.

6. The method according to claim 5, wherein
the surveying instrument includes a guide light irradiating unit that is configured to emit two color guide lights to enable identification of a horizontal direction with respect to a collimation axis of the surveying instrument and enable identification of a position in a collimation axis direction with respect to the collimation axis of the surveying instrument, and
in the steps (e) and (h),
the terminal control unit performs the guidance by making the surveying instrument collimate the first measurement point or the next measurement point which is a guidance destination by a collimation axis and making the surveying instrument drive the guide light irradiating unit.

7. The method according to claim 1, wherein the position acquiring device is a GNSS device configured to be held by the worker, the GNSS device being capable of acquiring its own position based on a navigation signal.

8. The method according to claim 1, wherein
in the steps (e) and (h),
the terminal control unit makes the position acquiring device acquire position coordinates of the worker,
the terminal control unit calculates a distance and a direction from the worker to the first measurement point or the next measurement point serving as a guidance destination, and
the terminal control unit displays a compass display according to the distance and the direction on the terminal display unit.

9. A mobile terminal comprising:
a terminal communication unit communicating with a position acquiring device configured to be capable of acquiring position coordinates of a worker, the position acquiring device including a communication unit;
a terminal operation unit;
a terminal display unit; and
a terminal control unit including at least one processor and at least one memory, wherein
the terminal control unit is configured to:
read three-dimensional design data including a plurality of center points which are set at predetermined intervals on a centerline of a route, and a plurality of measurement points which are set on a cross-section passing through the center points, the cross-section being orthogonal to the centerline, and displayed on the terminal display unit;
set an advancing direction of observation to a cross-sectional direction or a route direction in the three-dimensional design data;
set a first measurement point in the three-dimensional design data;
make the position acquiring device installed at a known point acquire position coordinates of the worker;
guide the worker to the first measurement point;
make the position acquiring device acquire position coordinates of the worker at the first measurement point;
set a not-yet-measured measurement point nearest from a current position of the worker in the set advancing direction of observation as a next t measurement point;
guide the worker to the next measurement point; and after that,
successively replace the first measurement point with the measurement point that the worker has been guided to and repeat making the position acquiring device acquire position coordinates of the worker at the first measurement point,
setting a not-yet-measured measurement point nearest from a current position of the worker in the set advancing direction of observation as a next measurement point, and guiding the worker to the next measurement point until there are no more not-yet-measured measurement points;
wherein the cross-sectional direction in the advancing direction of observation is a direction of a series of observations with which making advancement in a direction of a point nearest from a start point along a cross-section, making movement to a nearest cross-section when all points on the cross-section are measured, and making advancement along the cross-section are repeated, and the route direction in the advancing direction of observation is a direction of a series of observations with which making advancement in a direction of a point nearest from a start point along a route, making movement to a nearest point along the same cross-section when all constituent points on a same line extending parallel to the centerline are measured, and making advancement along the route are repeated, and
during observation, by the worker pressing a guidance point switching button which is displayed on the terminal display unit together with the three-dimensional design data, the terminal control unit sets a measurement point nearest from the current position of the worker as the first measurement point irrespective of the advancing direction of observation.

10. A survey system comprising:
a position acquiring device configured to be capable of acquiring position coordinates of a worker, the position acquiring device including a communication unit; and
a mobile terminal according to claim 9.

11. A non-transitory computer-readable storage medium comprising a program to make a computer terminal including a terminal communication unit communicate with a position acquiring device which is configured to acquire position coordinates of a worker, the position acquiring device including a communication unit, a terminal display unit, a terminal operation unit, and a terminal control unit including a processor and a memory executing the steps of:
- (j) the terminal control unit reading three-dimensional design data including a plurality of center points which are set at predetermined intervals on a centerline of a route, and a plurality of measurement points which are set on a cross-section passing through the center points, the cross-section being orthogonal to the centerline, and displayed on the terminal display unit;
- (k) the terminal control unit setting an advancing direction of observation to a cross-sectional direction or a route direction in the three-dimensional design data;
- (l) the terminal control unit setting a first measurement point in the three-dimensional design data;
- (m) the terminal control unit making the position acquiring device acquire position coordinates of the worker;
- (n) the terminal control unit guiding the worker to the first measurement point;
- (o) the terminal control unit making the position acquiring device acquire position coordinates of the worker at the first measurement point;
- (p) the terminal control unit setting a not-yet-measured measurement point nearest from a current position of the worker in the set advancing direction of observation as a next measurement point;
- (q) the terminal control unit guiding the worker to the next measurement point; and
- (r) successively replacing the measurement point in the step (o) with the measurement point that the worker has been guided to and repeating the steps (o) to (q) until there are no more not-yet-measured measurement points, wherein the cross-sectional direction in the advancing direction of observation is a direction of a series of observations with which making advancement in a direction of a point nearest from a start point along a cross-section, making movement to a nearest cross-section when all points on the cross-section are measured, and making advancement along the cross-section are repeated, and the route direction in the advancing direction of observation is a direction of a series of observations with which making advancement in a direction of a point nearest from a start point along a route, making movement to a nearest point along the same cross-section when all constituent points on a same line extending parallel to the centerline are measured, and making advancement along the route are repeated, and during observation, by pressing a guidance point switching button which is displayed on the terminal display unit together with the three-dimensional design data, the terminal control unit sets a measurement point nearest from the current position of the worker as the first measurement point irrespective of the advancing direction of observation, and executes the steps (m) to (r).

* * * * *